Aug. 4, 1970

E. HAYES 3,522,713

UNIVERSAL JOINT FOR WRENCHES

Filed Oct. 3, 1968

INVENTOR.
Eugene Hayes
BY John A. Hamilton
Attorney.

United States Patent Office 3,522,713
Patented Aug. 4, 1970

3,522,713
UNIVERSAL JOINT FOR WRENCHES
Eugene Hayes, Kansas City, Kans., assignor of fifty percent to Charles Atchison, Shawnee, Kans.
Filed Oct. 3, 1968, Ser. No. 764,827
Int. Cl. F16d 3/26
U.S. Cl. 64—17     2 Claims

ABSTRACT OF THE DISCLOSURE

A universal joint structure for interconnecting the shank or handle of a wrench to the socket or other work-engaging portion thereof, said joint structure including end members connected by means permitting universal misalignment of the end members, and a coil spring encircling said joint and connected at its ends to said end members, whereby said end members are normally but yieldably held in axially aligned relation.

---

This invenition relates to new and useful improvements in wrenches, and has particular reference to wrenches of the open-ended socket type.

It is common practice with wrenches of this type to interpose a universal joint between the socket or other work-engaging member, and the shank or handle by means of which the socket is turned. This permits the handle or shank to be axially mis-aligned with the socket, so that the socket may be applied operatively to bolts, nuts and the like to which access would otherwise be difficult or even impossible. However, all existing universal joints for this purpose within my knowledge are "limp," that is, without support of any type tending to hold the socket in axial alignment with the shank. Thus, the application of the socket to a nut or other work piece is almost necessarily a two-handed operation for the user, one hand being used to support and manipulate the socket, and the other hand to support the shank. This is often a troublesome and tedious task, particularly in locations to which full access is difficult.

Accordingly, the principal object of the present invention is the provision of a universal joint for wrenches having straightening means operable to hold it resiliently and yieldably in an axially straight position so long as the socket is not engaged on a work piece, in order that the wrench may be handled conveniently and applied to the work piece by holding only the shank thereof, said straightening means nevertheless being sufficiently yieldable that once the socket has been engaged with the work piece, the universal joint may pivot or flex normally in its usual manner.

Another object is the provision of a universal joint of the character described wherein the straightening means, as a separate element, may be applied to many pre-existing universal joints without change or modification of the latter in any way.

The invention may be summarized as the provision of a universal joint consisting of a pair of end members adapted to be connected respectively with the shank and the work-engaging member of a wrench, means connecting said end members to permit relative universal pivotal movement therebetween, and a helical spring secured coaxially at its ends respectively to each of said end members.

Other objects are extreme simplicity and economy of construction, and efficiency and dependability of operation.

Figure 1:
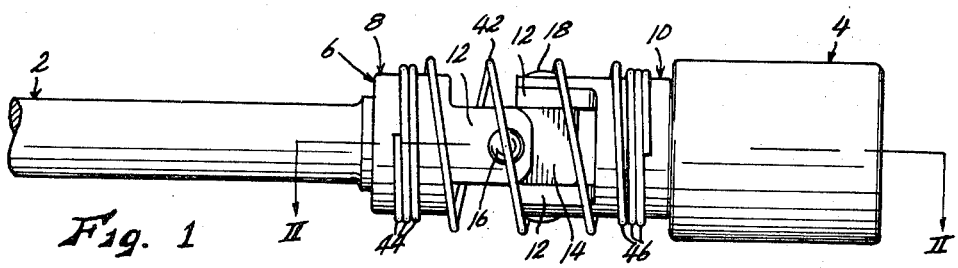
Figure 2:
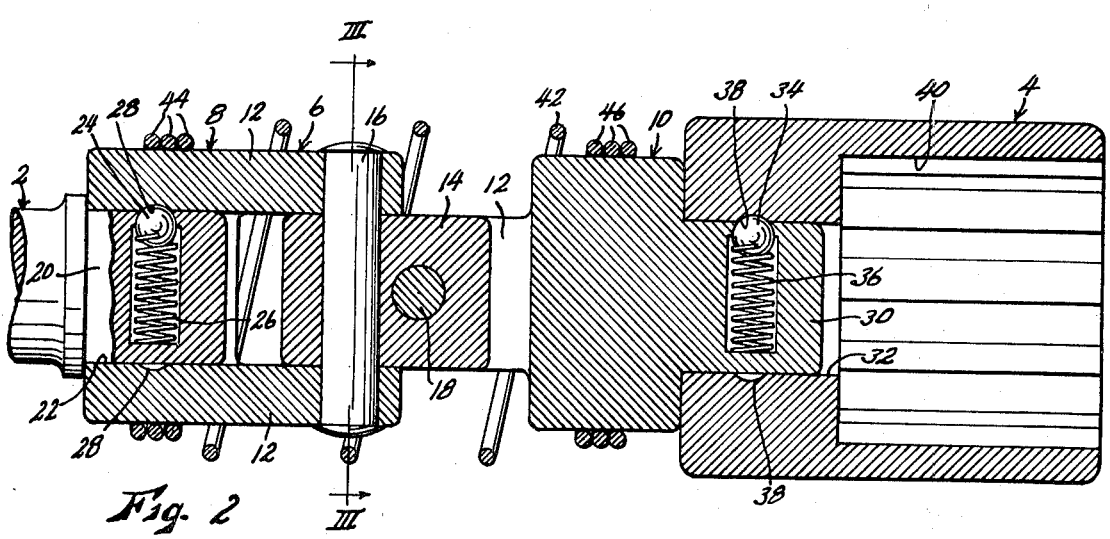
Figure 3:
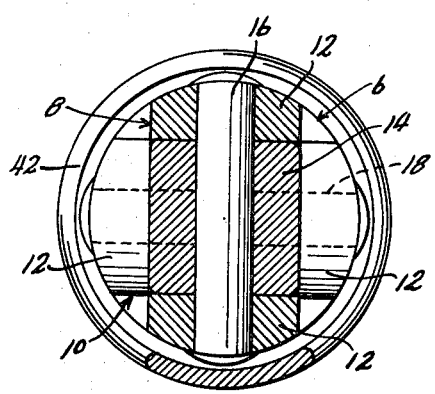

With these objects in view, as well as other objects which will appear in the course of the specification, reference will be had to the accompanying drawing, wherein:

FIG. 1 is a fragmentary side elevational view of a wrench including therein a universal joint embodying the present invention, FIG. 2 is an enlarged sectional view taken on line II—II of FIG. 1, with parts left in elevation, and FIG. 3 is a sectional view taken on line III—III of FIG. 2.

Like reference numerals apply to similar parts throughout the several views, and the numerals 2 and 4 apply respectively to the shank (shown fragmentarily) and the socket of a wrench, with a universal joint indicated generally by the numeral 6 interposed between said shank and said socket. Said universal joint includes a pair of externally cylindrical end members 8 and 10 each having a pair of spaced apart fingers 12 extending parallel to its axis toward the other of said end members. Said fingers are spaced apart diametrically with respect to the end member of which they form a part. A rectilinear block 14 is disposed between the fingers of both end members, said block being pivotally connected to fingers 12 of end member 8 by a pin 16, and pivotally connected to fingers 12 of end member 10 by pin 18. Pins 16 and 18 extend transversely to the joint axis, and are disposed at right angles to each other. This constitutes a universal joint of the common Hooke's type in which the end members 8 and 10 are capable of pivoting universally with respect to each other, but in which either end member is capable of transmitting a rotary torque to the other.

Shank 2 is provided at its end with a squared lug 20 adapted to be engaged non-rotatively in a squared socket 22 formed in the outer end of end member 8 of the universal joint, and releasably retained therein by a detent ball 24 carried by said lug and urged outwardly by a spring 26 to engage in a notch 28 in the wall of socket 22. Similarly, end member 10 of the universal joint is provided at its outer end with a squared lug 30 adapted to be engaged non-rotatively in a squared socket 32 formed in the base of wrench socket 4, and retained therein by a detent ball 34 carried by the lug and urged outwardly by a spring 36 to engage in a notch 38 in the wall of socket 32. When use of the universal joint is not desired, shank lug 20 may be engaged directly in socket 32. Wrench socket 4 has a polygonal recess 40 formed in the outer end thereof for non-rotative engagement with a bolt head, nut or the like.

The universal joint thus far described is of course standard. The present invention contemplates the addition thereto of a straightening member operable to hold end memberc 8 and 10 yieldably in coaxial alignment with each other. As shown, this straightening member consists of a helical spring 42 disposed concentrically about the universal joint. At one end, said spring has a number, perhaps two or three, closed or contacting convolutions 44 snugly engaged about the cylindrical external surface of end member 8, and at its opposite end the spring has two or three closed convolutions 46 snugly engaged about the cylindrical external surface of end member 10. Preferably, these end convolutions have an internal diameter, when relaxed, slightly smaller than their respective universal joint end sections, so that they must be resiliently expanded to mount the spring. Intermediate the end convolutions 44 and 46, the convolutions of spring 42 are spaced well apart, and have an internal diameter somewhat greater than the external diameters of end members 8 and 10.

In use, the operation of the universal joint per se is standard and well known. Spring 42 serves to hold the end sections 8 and 10, and hence shank 2 and wrench socket, yieldably in coaxially aligned relation, so that a user, holding the wrench only by means of shank 2, can easily and conveniently direct and manipulate socket 4 to engage it on a bolt, nut or the like. The transverse flexural strength of the spring should be sufficiently great to support the heaviest socket 4 likely to be attached to the universal joint, in the manner just described. The closed end convolutions 44 and 46 of the spring have a dual function. First, they provide secure end mountings for the spring and prevent slippage thereof along end members 8 and 10. This eliminates any necessity of auxiliary end fastenings for the spring, and hence permits use of the spring with many pre-existing universal joints without modification or adaptation of the latter in any way. Second, end convolutions 44 and 46 hold each end portion of the spring accurately in coaxial relation to the end members 8 and 10 of the joint, preventing canting of the spring ends on the universal joint, which could cause misalignment of the spring and as a result the supporting of socket 4 in a non-aligned position. The enlargement of the intermediate convolutions of the spring provides room within said spring for the universal joint to flex therein without interference, so that the entire length of the spring between its end convolutions is utilized. The enlargement of the intermediate convolutions also provides that they will clear the ends of pins 16 and 18, if said pins extend outwardly from the cylindrical external surfaces of end members 8 and 10.

It should be noted that spring 42 does not function in the usual manner of a helical spring, in that the longitudinal resilience thereof is not intrinsically necessary in the present invention. Instead, it operates as a transversely flexible elongated member, in the manner of a leaf spring. It does expand longitudinally at one side, and contract at the other, whenever the universal joint is flexed, but this is merely ancillary to its primary transverse flexure. An alternative structure in which no longitudinal resilience is operative would be one or more straight spring wires extending longitudinally of the joint, said wires being fixed to one of the end members 8 or 10, and having longitudinal sliding connection to the other. However, the helical spring serves the purpose admirably, and is much simpler and cheaper than the alternative. Also, whatever transversely flexible member is used, it should have a resistance to flexure which is equal in all directions of flexure of the universal joint, i.e. is balanced with respect to the axis of the joint. The helical spring fully meets this requirement, while the alternative would not.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. A universal joint adapted to be interposed between the shank and work-engaging member of a wrench, said joint comprising:
    (a) a pair of end members adapted to be attached respectively to said shank and said work-engaging member, said end members having intersecting axes and being externally continuously cylindrical coaxially with their axes,
    (b) means connecting said end members whereby to permit universal pivotal misalignment of their axes, and
    (c) an elongated transversely resilient straightening member extending longitudinally of the axes of said end members and attached at its respective ends to said end members, whereby said end members are urged resiliently toward a coaxial relationship, said straightening member constituting a helical spring coiled about said end members and extending therebetween, said spring being provided at each end with a number of closed convolutions sized to grip its associated end member tightly.

2. A universal joint as recited in claim 1 wherein the convolutions of said spring intermediate said closed end convolutions are open and are enlarged to an internal diameter somewhat greater than the external diameter of said end members.

References Cited

UNITED STATES PATENTS

| | | | |
|---|---|---|---|
| 1,324,898 | 12/1919 | Hopcraft | 64—17 |
| 2,005,202 | 6/1935 | Pilger | 64—17 |
| 2,256,624 | 9/1941 | Odlum | 64—17 |
| 2,304,766 | 12/1942 | Pratt | 64—17 |
| 2,327,821 | 8/1943 | Rueb | 64—17 |

JAMES A. WONG, Primary Examiner